Aug. 2, 1932.    L. W. FULLER    1,869,357
WEIGHING SCALE
Filed Jan. 9, 1929    2 Sheets-Sheet 1
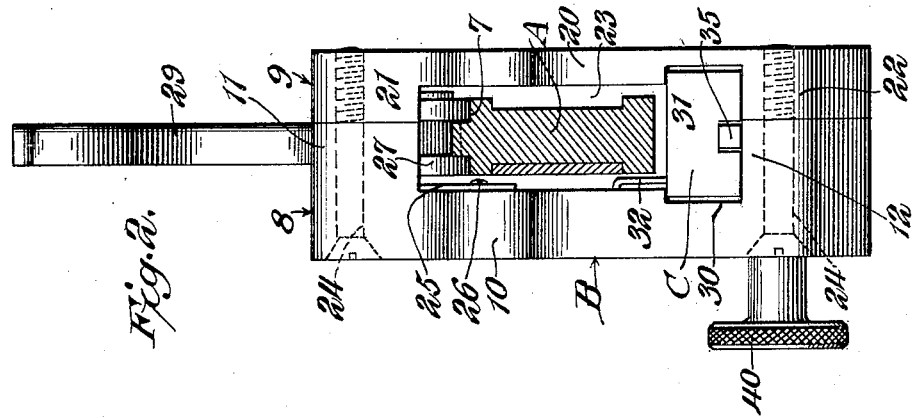
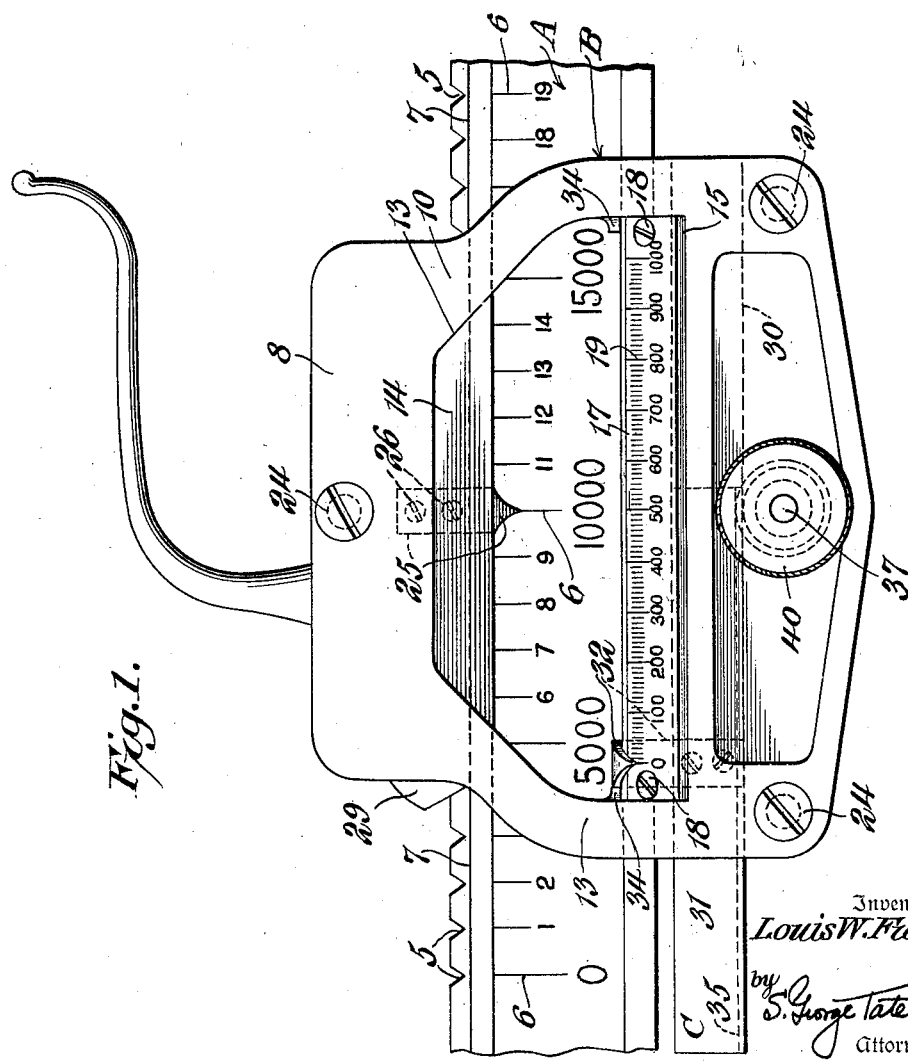
Inventor,
Louis W. Fuller,
by S. George Tate
Attorney.

Aug. 2, 1932.  L. W. FULLER  1,869,357
WEIGHING SCALE
Filed Jan. 9, 1929   2 Sheets-Sheet 2
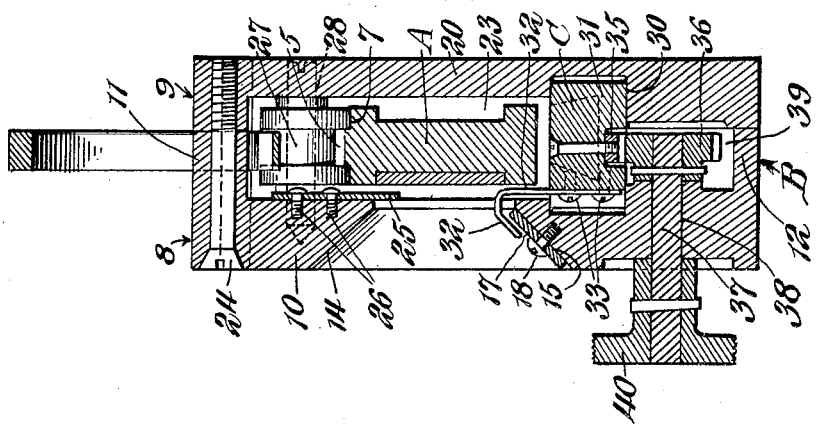
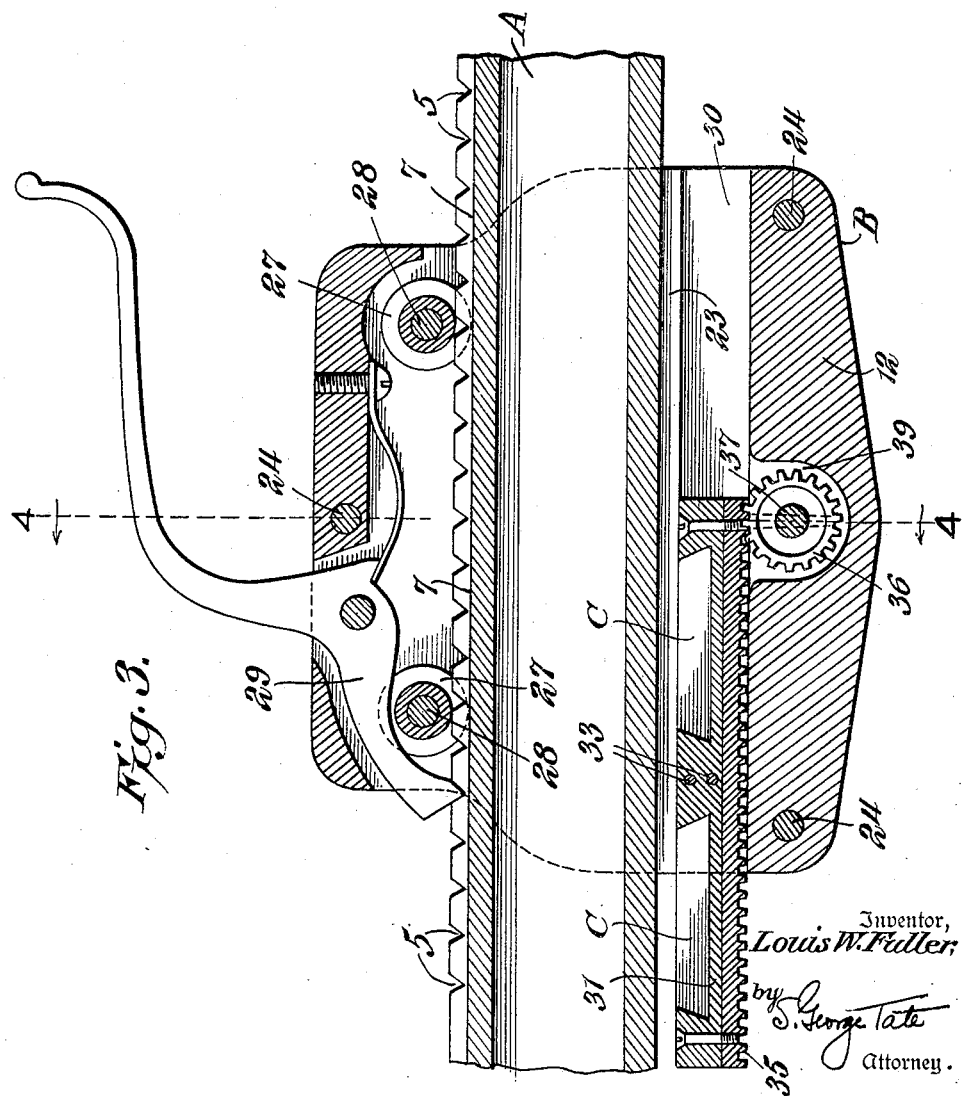
Inventor,
Louis W. Fuller,
by S. George Tate
Attorney.

Patented Aug. 2, 1932

1,869,357

UNITED STATES PATENT OFFICE

LOUIS W. FULLER, OF RUTLAND, VERMONT, ASSIGNOR TO THE HOWE SCALE COMPANY, OF RUTLAND, VERMONT, A CORPORATION OF VERMONT

WEIGHING-SCALE

Application filed January 9, 1929. Serial No. 331,280.

The invention generally relates to weighing scales of the type embodying a scale beam and a poise slidable along the scale beam to ascertain the correct weight of the load being weighed, and the said invention primarily resides in the provision of a new and improved poise structure better proportioned and balanced than those now commonly employed and in which features of construction and arrangement are provided which render possible the taking of main and fraction scale readings with greater facility and accuracy than has heretofore been possible in the use of conventional forms of poises.

In its more detailed nature the invention seeks to provide a new and improved scale beam poise slidable along the scale beam with its weight substantially centered and balanced and having a novel window through which the main scale on the scale beam may be read, and a fraction scale mounted in the window in close association with the main scale so as to be readable with the said main scale. The poise is provided with a main scale indicator centrally positioned in the window and carries an auxiliary or fraction indicating poise which is slidable relatively to the main poise through accurate adjustment rack and gear agencies and which in turn carries an indicator finger associated with the fraction scale.

Another object of the invention is to construct and arrange the parts so as to dispose the weight of the auxiliary or fractional poise centrally beneath the scale beam so as to avoid tendencies to tip the main poise on the scale beam.

Another object of the invention is to so construct and arrange the poise window, the main and fraction scales and the indicators, that the weight readings may be made with facility and without inaccuracies due to parallax.

With these and other objects in view which will more fully appear, the nature of the invention will be more clearly understood by following the description, the appended claims, and the several views illustrated in the accompanying drawings.

In the accompanying drawings:

Figure 1 is a face view of the invention mounted upon a section of a scale beam, Figure 2 is an end view, the scale beam being shown in vertical cross section, Figure 3 is a central longitudinal section of the poise, and Figure 4 is a vertical cross section taken on the line 4—4 of Figure 3.

The poise is designed to be used on heavy duty weighing beams where it is desirable to employ two poises, one to indicate the larger divisions, as every 1000 lbs., the other to indicate the fractional graduations. In the accompanying drawings the scale beam is designated A. The main poise, slidable on the scale beam, is designated B, and the small or auxiliary poise which is slidably mounted on the main poise is designated C.

The scale beam A is of the usual construction and is provided along its upper edge with equidistantly spaced notches 5, and on its front face with a graduated main scale 6 to indicate the approximate weight of the load in thousand pounds, the graduations registering with the notches. The beam, on opposite sides of the notches, is provided with tracks 7, the purpose of which will be described later.

The main poise B comprises a frame or housing consisting of front and rear sections 8 and 9 respectively.

The front section embodies a front plate 10 and upper and lower rearwardly extending horizontal flanges 11 and 12 respectively. The front plate 10 is provided with a comparatively large opening or window 13 having a downwardly and rearwardly inclined upper defining wall 14 and an upwardly and rearwardly inclined lower defining wall 15. A scale plate 17 is seated in the window on the lower defining wall 15 and is secured in position by the screws 18, the scale being provided with graduations 19 indicative of fractional weights. The lower edge of the upper inclined wall 14 is disposed below the notches 5 and the tracks 7, and forms within the opening 13 the upper horizontal edge of the main scale 6. The fractional scale 17 is arranged directly below and closely adjacent the main scale 6 and consequently both scales are easily read through the single opening 13 of the poise.

The rear section 9 embodies a rear plate 20 and upper and lower forwardly extending flanges 21 and 22 which respectively register with the flanges 11 and 12 of the front plate 10. The sections 8 and 9 thus conjointly form a longitudinally extending opening 23 which receives the beam A. The said sections are detachably connected together by screws 24.

To the rear or inside face of the front plate 10, and centrally thereof, an indicator or pointer finger 25 is secured by screws 26 or other suitable securing means, and the said indicator extends down below the lowermost edge of the upper wall 14 into proper indicating association with and closely adjacent the scale 6 so as to avoid any possible reading inaccuracies due to parallax.

The poise is provided with supporting flanged anti-friction rollers 27 which are mounted on suitable shaft bearings 28 in the opening 23 with their flanges adapted to ride on the scale beam tracks 7. The usual spring pressed notch engaging detent 29 is also provided.

The half pieces 8 and 9 comprising the main poise are each longitudinally recessed to conjointly form a small or auxiliary poise slideway 30 extending longitudinally and centrally beneath the scale beam A. See Figures 2 and 3. The auxiliary poise C which is in the nature of a long rectangular block 31 is slidable in the slideway 30 and an indicator finger 32 is secured by screws 33 in a recess formed centrally of the ends of and in the front face of the said poise 31 and projects upwardly therefrom and forwardly over the fractions-indicating scale 17 as shown in Figures 1 and 4 of the drawings. At each end limit of the scale plate 17, the end defining walls of the window 13 are provided with stops 34 to be engaged by the finger 32 for the purpose of limiting the longitudinal movement of the poise 31.

To provide for the desired longitudinal movement of the secondary or auxiliary poise 31 the lower face thereof carries a toothed rack 35 with which meshes a pinion 36 carried on one end of an operating shaft 37 rotative in a suitable bearing provided therefor as at 38 in the poise section 8. The pinion 35 is accommodated in a recess 39 formed in the said section 8, and a turning knob 40 is secured upon the other end of the shaft 37 to facilitate turning of the pinion and the imparting of longitudinal movement to the poise 31 in one direction or another as may be required.

In the foregoing description and in the drawings, I have disclosed a simple and compact single unit main and secondary or auxiliary poise, which is weight-centered and balanced in a manner assuring ease of movement and avoiding tendencies to tip on the scale beam, and in which means is provided to indicate conveniently through a single sight window both the main and fractional load weight readings without danger of inaccuracies or error due to parallax.

It is of course to be understood that the details of structure and arrangements of parts may be variously changed and modified without departing from the spirit and scope of my invention.

I claim:

1. In a scale, the combination with a beam having a graduated main scale, of a poise movable along said beam and having a sight window therein through which the main scale may be viewed, a graduated fractional scale on said poise and arranged in said sight window, a secondary poise carried by and movable relatively to the first mentioned poise, an indicating means carried by the first mentioned poise and associated with the main scale, and an indicating means carried by the secondary poise and associated with the fractional scale, the walls defining the sides of the sight window and the said secondary-poise-carried indicating means constituting limiting means to limit movement of the said secondary poise.

2. A composite beam scale poise unit comprising a body having a longitudinal slot therethrough to slidably receive a scale beam, and a window opening into the slot and through which a scale on the beam may be viewed when the poise is mounted, said body also having a secondary poise slideway beneath the said slot, a secondary poise slidable in the slideway, a fractional scale in the window, and an indicator finger carried by the secondary poise and extended into indicating association with the fractional scale, said body being formed of matching sections each having complementary recesses cooperating to form the slot and slideway and one thereof having the window.

3. A composite beam scale poise unit comprising a body having a longitudinal slot therethrough to slidably receive a scale beam, and a window opening into the slot and through which a scale on the beam may be viewed when the poise is mounted, said body also having a secondary poise slideway beneath the said slot and communicating with the slot, a secondary poise slidable in the slideway, a fractional scale in the window, and an indicator finger carried by the secondary poise and extended through a portion of the slot and the window into indicating association with the fractional scale and adapted to engage the side walls which define the window to act as limiting stops for limiting movement of the said secondary poise.

4. In a scale beam, a main poise having a central visibility opening with lugs on either side of said opening, a relatively movable fractional poise with a projection adapted to move between said lugs and by engagement with said lugs limit the motion of said fractional poise, and means for indicating main and fractional readings through said opening.

5. In a scale beam poise, the combination of a scale beam having graduations and a main poise slidable thereon and having a central visibility opening and means for indicating the beam graduations through said opening, a fractional poise centrally disposed under the main beam, and means for indicating fractional readings through the openings in the main poise.

6. In a scale beam poise, the combination of a scale beam having graduations and a main poise slidable thereon and having a central visibility opening and means for indicating the beam graduations through said opening, a fractional poise centrally disposed under the main beam, means for indicating fractional readings through the opening in the main poise, a rack and pinion for relatively moving the fractional poise, stops in the visibility opening, and a projection carried by the fractional poise and positioned for engaging the stops for the purpose described.

In testimony whereof I hereunto affix my signature.

LOUIS W. FULLER.